United States Patent
Ishii et al.

(10) Patent No.: US 6,643,524 B1
(45) Date of Patent: Nov. 4, 2003

(54) BASE STATION SERIAL CONNECTION COMMUNICATION SYSTEM IN A MOBILE COMMUNICATION SYSTEM

(75) Inventors: Nobuaki Ishii, Tokyo (JP); Kiyotaka Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/414,866

(22) Filed: Oct. 8, 1999

(30) Foreign Application Priority Data

Oct. 9, 1998 (JP) .......................................... 10-287551

(51) Int. Cl.[7] ................................................ H04B 1/38
(52) U.S. Cl. ........................ 455/560; 370/338; 370/328
(58) Field of Search ................................ 370/395, 389, 370/321, 337, 328, 338, 347, 468, 474, 340; 455/561, 460, 453

(56) References Cited

U.S. PATENT DOCUMENTS 5,715,245 A * 2/1998 Suonvieri .................... 370/337
5,781,547 A * 7/1998 Wilson ........................ 370/352
5,854,786 A * 12/1998 Henderson et al. ......... 370/218
6,226,518 B1 * 5/2001 An .............................. 455/446

FOREIGN PATENT DOCUMENTS

EP 0 830 041 3/1998
WO 99/35862 7/1999

* cited by examiner

*Primary Examiner*—Nay Maung
*Assistant Examiner*—Nick Corsaro
(74) *Attorney, Agent, or Firm*—Foley & Lardner

(57) ABSTRACT

In a base station controller 20, each of header addition/deletion units 250 through 252 corresponding to base stations serially connected to a shared communication line 60 adds to a communication signal transmitted to a particular base station a header having an address identifier specific to the particular base station to produce a communication signal cell. A cell collection/distribution unit 260 cell-multiplexes the communication signal cells to produce a cell-multiplexed signal which is transmitted through a transmission unit 270 to the base stations serially connected. Each base station checks the headers of the communication signal cells supplied thereto and acquires the communication cell having the address identifier specific to the base station itself. The remaining cells are transferred through the shared communication line to the next base station serially connected.

22 Claims, 10 Drawing Sheets

BASE STATION SERIAL CONNECTION COMMUNICATION SYSTEM IN A MOBILE COMMUNICATION SYSTEM

BACKGROUND OF THE INVENTION

This invention relates to a communication system between a base station and a base station controller in a mobile communication system and, in particular, to a communication system between a base station controller and a plurality of base stations serially connected to the base station controller by the use of a single shared communication line.

A mobile communication system is well known which comprises a base station controller connected to a mobile communication exchange through a wire link, and a plurality of base stations connected to the base station controller through wire links, respectively. Each base station is connected through a radio link to a plurality of mobile stations within a service area of the base station.

FIG. 1 is a block diagram showing an example of a structure of a typical conventional mobile communication system.

The mobile communication system exemplified in FIG. 1 includes a mobile communication exchange 600 connected through a communication line 630 to a public exchange network, a base station controller 610, and a plurality of base stations (#0, #1, #2) 620, 621, and 622. The mobile communication exchange 600 is connected through a communication line 640 to the base station controller 610. The base station controller 610 is connected to the base stations (#0, #1, #2) through independent communication lines 650, 651, and 652, respectively.

Mobile terminals have no direct concern with this invention and, therefore, are not illustrated in this figure and subsequent figures.

In the system illustrated in FIG. 1, the communication line 650 serves as a private communication line between the base station controller 610 and the base station (#0) 620. Likewise, the communication lines 651 and 652 serve as private communication lines independent from each other.

However, in case where a service area of a particular base station, for example, the base station (#0) 620 always has a small traffic (i.e., a load), the transmission efficiency of the communication line 650 is degraded.

In view of the above, development is made of a system in which a plurality of base stations having a small traffic are serially connected to a single communication line connected to a base station controller in order to share the single communication line among the base stations.

FIG. 2 is a block diagram showing an example of a structure of a conventional mobile communication system adopting a base station serial connection system of the type. A similar technique is disclosed in Japanese Unexamined Patent Publication (JP-A) No. 56-156034.

The mobile communication system exemplified in FIG. 2 includes a mobile communication exchange 700 connected through a communication line 730 to a public exchange network, a base station controller 710, and a plurality of base stations (#0 through #2) 720, 721, and 722. The mobile communication exchange 700 is connected through a communication line 740 to the base station controller 710. The base station controller 710 is connected to the base station (#0) 720 through a communication line 750. To the base station (#0) 720, the base station (#1) 721 is serially connected through a communication line 751. The base station controller 710 and the base station (#2) 722 are connected through a private communication line 752, in the manner similar to the conventional system illustrated in FIG. 1.

In the above-mentioned base station serial connection system, the communication line 750 is used as a shared communication line through which communication data between the base station controller 710 and the base station (#0) 720 and another communication data between the base station controller 710 and the base station (#1) 721 are multiplexed and transmitted, for example, according to a time-division multiplex communication system.

FIG. 3 is a view of a frame structure showing one example of the multiplex communication system for the shared communication line 750 in FIG. 2. In the illustrated example, a communication line of 2 Mbps is used. The communication line of 2 Mbps has a frame rate of 8000 frame/second. Each single frame is composed of 32 time slots each of which is eight bits long. Each time slot has a transmission capacity of 64 Kbps. In the frame structure illustrated in FIG. 3, the 32 time slots (TSO through TS31) contains a synchronization TS 800 for establishing frame synchronization and a control TS 810 for controlling the shared communication line. The remaining 30 time slots other than the synchronization TS 800 and the control TS 810 are used as TS groups 820 and 821 assigned to communication with the base station (#0) 720 and to communication with the base station (#1) 721, respectively. In this conventional example, the two base stations (#0) 720 and (#1) 721 are serially connected. In case where a greater number of base stations are serially connected, the 30 communication time slots are assigned to communication with the respective base stations, taking their traffics into consideration.

As described above, in the conventional mobile communication system, the transmission capacity of the shared communication line is preliminarily distributed fixedly to the respective base stations, taking their traffics into consideration, to realize serial connection of the base stations by the shared communication line.

However, the above-mentioned conventional base station serial connection system in the mobile communication system is disadvantageous in the following respects.

First, the maximum transmission rate to each base station is determined by the transmission capacity of the shared communication line, which is preliminarily physically assigned upon installation of the base station. In this connection, the transmission capacity must be assigned assuming the greatest traffic of each base station at the busiest state. Therefore, at the base station exhibiting wide variation in load, the transmission capacity assigned thereto can not effectively be utilized in a normal state so that the line efficiency is decreased. On the other hand, in case where an excessive load exceeding the maximum transmission rate assumed as mentioned above is temporarily applied, restriction is imposed upon transmission.

In case where a particular base station has a high load exceeding the maximum transmission rate, another base station may possibly have a small load leaving a spare transmission capacity. Even in this event, the spare transmission capacity can not be utilized by the particular base station of the high load because the transmission capacity assigned to each base station is fixed. Thus, restriction is imposed upon transmission so that the line efficiency of the shared communication line is decreased as a whole.

The transmission capacity of the shared communication line is preliminarily physically assigned to each base station upon installation of the base station. Therefore, in order to additionally install a new base station to be serially connected to the shared communication line, it is necessary to change the transmission capacity assigned to each of the existing base stations connected to the shared communication line. This requires modification in facility of the existing base stations.

SUMMARY OF THE INVENTION

In order to solve the above-mentioned problems, it is an object of this invention to provide a base station serial connection communication system in a mobile communication system, which can be flexibly adapted to load variation of each base station and additional installation of a new base station and which has a high line efficiency.

According to this invention, there is provided a base station serial connection communication system in a mobile communication system including a base station controller for controlling a plurality of base stations serially connected through a shared communication line, wherein:

a communication signal between the base station controller and each of the base stations serially connected is converted into a communication signal cell which is given header information containing an address identifier of a corresponding one of the base stations, the communication signal cell being collected into a cell multiplexed signal to be transmitted or received through the shared communication line.

The base station controller comprises:

a plurality of header addition/deletion units provided in one-to-one correspondence to the base stations serially connected to the shared communication line, each of the units being for converting a communication signal to be transmitted to a corresponding one of the base stations into a communication signal cell which is given header information containing an address identifier of the corresponding base station, and for deleting header information from a communication signal cell transmitted from the corresponding base station to convert the communication signal cell into a communication signal to be transmitted to a mobile communication exchange; and a cell collection/distribution unit for collecting the communication signal cells obtained by conversion in the header addition/deletion units to produce a cell multiplexed signal to be transmitted through the shared communication line, and for distributing communication signal cells multiplexed in a cell multiplexed signal received through the shared communication line to corresponding ones of the header addition/deletion units in accordance with address identifiers contained in the header information.

Each of the base stations serially connected to the shared communication line comprises:

a header registering portion in which header information containing an address identifier of the base station in consideration is registered:

a cell multiplexing/demultiplexing portion which is for extracting, from a cell multiplexed signal delivered in a direction downstream from the base station controller through the shared communication line, a communication signal cell having the header information registered in the header registering portion and, if any base station is connected to a lower level downstream of the shared communication line, transferring the remaining part of the cell multiplexed signal towards a terminal end through the shared communication line and which is for collecting a communication signal cell to be delivered from the base station in consideration to the base station controller into a cell multiplexed signal to be delivered towards the base station controller through the shared communication line or, if any base station is connected to a lower level downstream of the shared communication line, multiplexing the communication signal cell onto a cell multiplexed signal supplied in a direction upstream from the terminal end; and a header deletion/addition portion for deleting the header information from the communication signal cell extracted by the cell multiplexing/demultiplexing portion to reproduce a communication signal addressed to the base station in consideration and for adding the header information registered in the header registering portion to a communication signal to be transmitted from the base station in consideration to the base station controller to convert the communication signal into the communication signal cell to be transmitted to the base station controller.

A variable-length packet is used as the communication signal cell.

A fixed-length packet is used as the communication signal cell.

The shared communication line is a time-division multiplex communication line. The cell multiplexed signal is transmitted or received using as a user data area in a time-slotless fashion all of a plurality of time slots forming each frame of the time-division multiplex communication line except a synchronization time slot for establishing frame synchronization and a control time slot for use in line control.

The base station controller comprises:

an ATM (Asynchronous Transfer Mode) switch for switching an ATM cell;

a plurality of header addition/deletion units provided in one-to-one correspondence to a plurality of channel units each of which is for converting a reception signal supplied from a mobile communication exchange into a communication signal to be transmitted to a corresponding one of the base stations and for converting a communication signal supplied from each of the base stations into a signal to be transmitted to the mobile communication exchange, each of the header addition/deletion units being for converting the communication signal transferred from a corresponding one of the channel units into the ATM cell with header information added thereto and transferring the ATM cell to the ATM switch, the header information including an address identifier of a destination base station as a VCI (virtual channel identifier) and identifier information of a communication line connected to the destination base station as a VPI (virtual path identifier), the header addition/deletion unit being for deleting the header information from the ATM cell switched by the ATM switch to reproduce a communication signal which is transferred to a corresponding one of the channel units; and a plurality of transmission units terminating the shared communication line and the private communication lines, respectively, for cell-multiplexing ATM cells switched by the ATM switch to produce a cell multiplexed signal to be transmitted to a corresponding one of the shared communication line and the private communication lines, and for transferring to the ATM switch the ATM cells multiplexed into a cell multiplexed signal supplied from a corresponding one of the shared communication line and the private communication lines;

the ATM switch being supplied with the ATM cell transferred from each of the header addition/deletion units for switching the ATM cell to a corresponding one of the transmission units with reference to the VPI, and being also supplied with the ATM cell transferred from each of the transmission units for switching the ATM cell to a corresponding one of the header addition/deletion units with reference to the VCI.

In this case, each of the base stations serially connected to the shared communication line comprises:

a header registering portion in which header information containing an address identifier of the base station in consideration is registered;

a cell multiplexing/demultiplexing portion which is for extracting, from a cell multiplexed signal delivered in a direction downstream from the base station controller through the shared communication line, an ATM cell having the header information registered in the header registering portion and, if any base station is connected to a lower level downstream of the shared communication line, transferring the remaining part of the cell multiplexed signal towards a terminal end through the shared communication line and which is for collecting an ATM cell to be delivered from the base station in consideration to the base station controller into a cell multiplexed signal to be delivered towards the base station controller through the shared communication line or, if any base station is connected to a lower level downstream of the shared communication line, multiplexing the ATM cell onto a cell multiplexed signal supplied in a direction upstream from the terminal end; and a header deletion/addition portion for deleting the header information from the ATM cell extracted by the cell multiplexing/demultiplexing portion to reproduce a communication signal addressed to the base station in consideration and for adding the header information registered in the header registering portion to a communication signal to be transmitted from the base station in consideration to the base station controller to convert the communication signal into the ATM cell to be transmitted to the base station controller.

In this case, the transmission unit provided in the base station controller and the cell multiplexing/demultiplexing portion provided in each of the base stations serially connected through the shared communication line or individually connected through private communication lines insert into the cell multiplexed signal an ATM cell with a vacant cell header representative of inclusion of no communication signal in absence of a transmission ATM cell to be transmitted.

Thus, in the base station serial connection communication system in the mobile communication system according to this invention, adjacent base stations having a relatively small traffic can easily be serially connected by a cell multiplex transmission system, utilizing the existing facility and the existing communication lines of the conventional mobile communication system.

Particularly when a service area is set along a main road or a railroad line, it is possible to easily enlarge the service area by the use of a single physical communication line. As compared with star connection of base stations by the use of private communication lines, the line cost can considerably be reduced.

Furthermore, logical multiplexing is carried out by the use of the cell data which is given the header information containing the address identifier corresponding to each base station. This makes it possible to share the total communication capacity of the physical line (shared communication line) among all base stations serially connected to the physical line. Therefore, the load variation in each base station can be absorbed one another by the statistical multiplexing effect. Thus, occurrence of restricted communication can be considerably reduced to achieve an excellent line efficiency of the system.

In order to additionally install a new base station in a serial fashion, it is sufficient to assign a new address identifier to the new base station additionally installed. This is because the logical multiplexing is adopted. Since repeated modification of, for example, line setting of the existing base stations is unnecessary, it is easy to additionally install a new base station in a serial fashion.

DETAILED DESCRIPTION OF THE INVENTION

Figure 1:
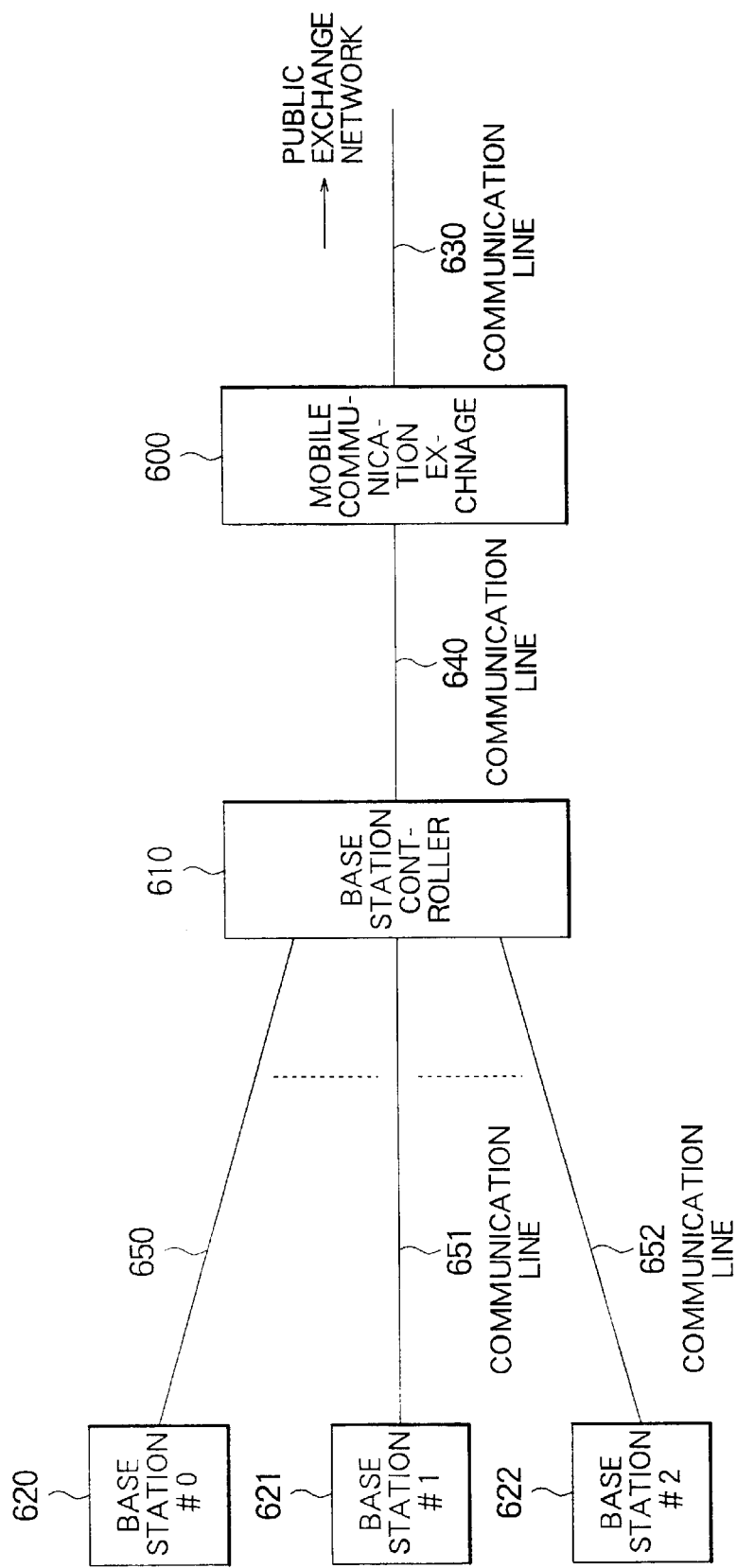
FIG. 1 is a block diagram of a typical mobile communication system.

Now, description will be made as regards embodiments of this invention with reference to the drawing.

Figure 4:
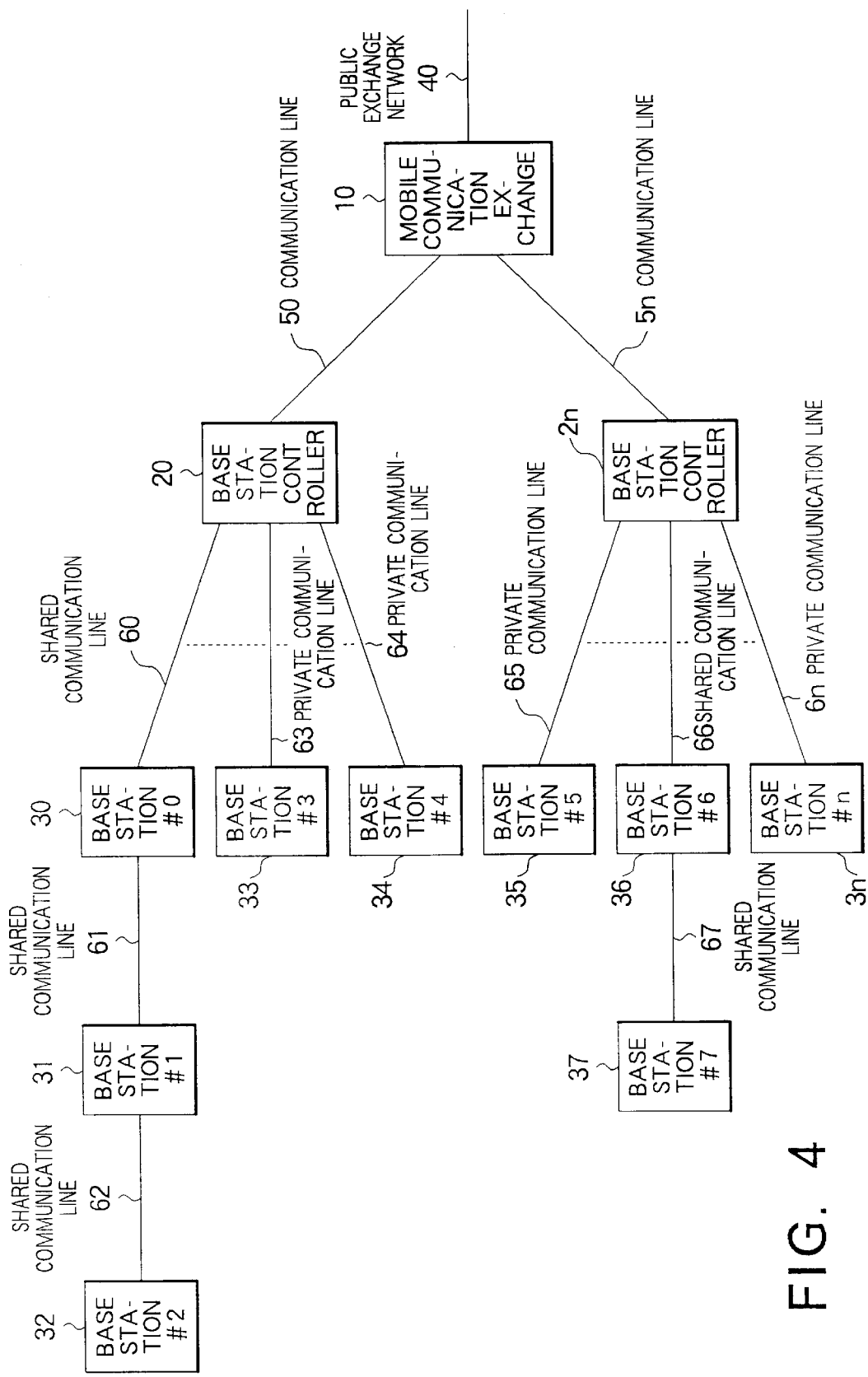
FIG. 4 is a block diagram of a base station serial connection communication system in a mobile communication system according to an embodiment of this invention.

Referring to FIG. 4, description will be made a base station serial connection communication system in a mobile communication system according to this invention.

The system illustrated in FIG. 4 includes a mobile communication exchange 10 connected through a communication line 40 to a public exchange network, a plurality of base station controllers 20 through 2n, and a plurality of base stations (#0 through #n) 30 through 3n. In FIG. 4, the base station controller 20, the base stations (#0 through #4) controlled by the base station controller 20, the base station controller 2n, and the base stations (#5 through #7) 35 through 37 and the base station (#n) 3n controlled by the base station controller 2n are illustrated by way of example.

The mobile communication exchange 10 is connected to the base station controller 20 via a communication line 50 and to the base station controller 2n via a communication line 5n.

The base station controller 20 is connected to the base station (#0) 30 via a shared communication line 60, to the base station (#3) 33 via a private communication line 63, and to the base station (#4) 34 via a private communication line 64.

The base station (#0) 30 is serially connected to the base station (#1) 31 via a shared communication line 61. The base station (#1) 31 is serially connected to the base station (#2) 32 via a shared communication line 62.

Likewise, the base station controller 2n is connected to the base station (#5) 35 via a private communication line 65, to the base station (#6) 36 via a shared communication line 66, and to the base station (#n) 3n via a private communication line 6n. The base station (#6) 36 is serially connected to the base station (#7) 37 via a shared communication line 67.

Figure 5:
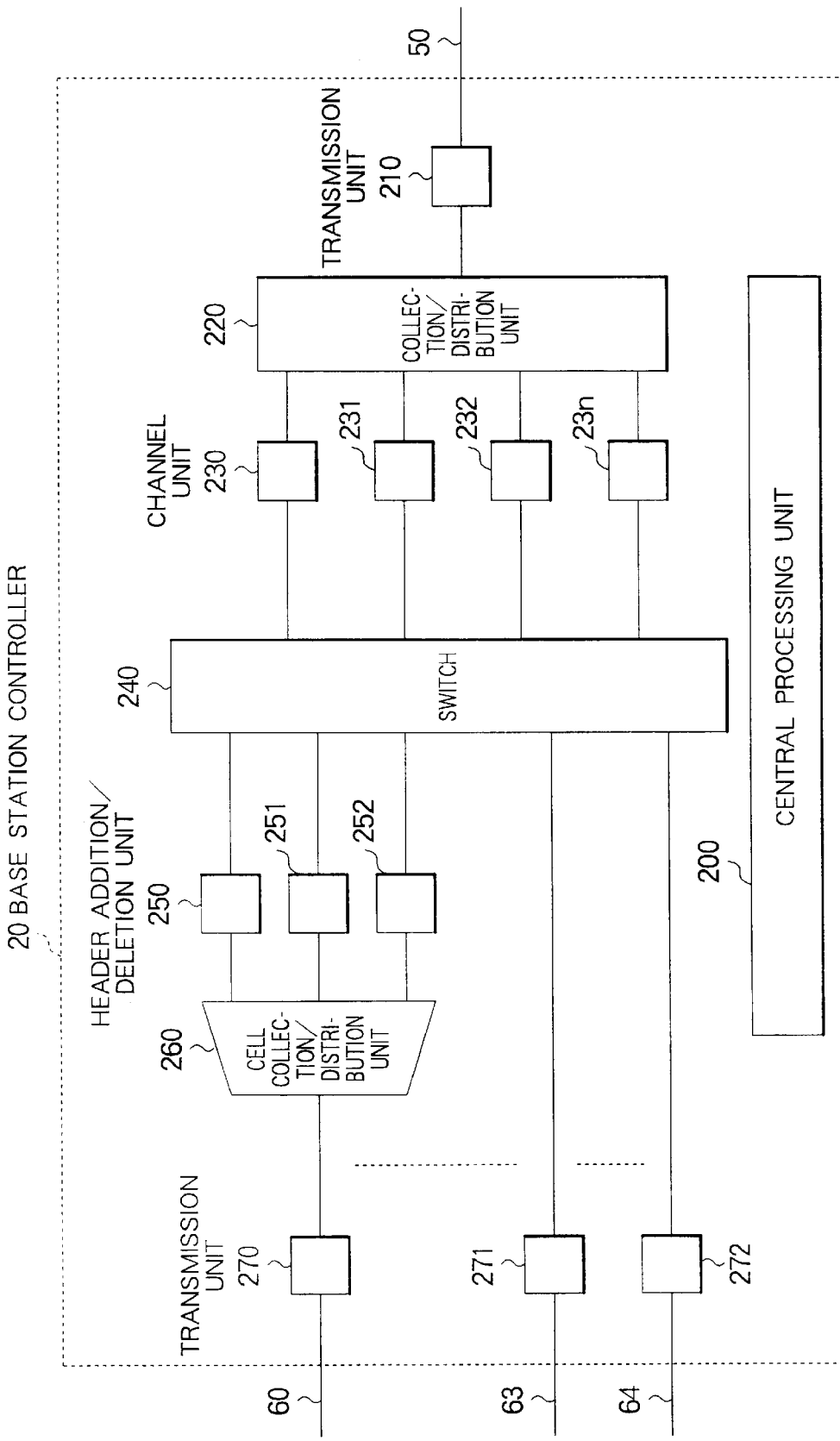
FIG. 5 is a block diagram of a structure of a base station controller illustrated in FIG. 4.

Referring to FIG. 5, the base station controller 20 in FIG. 4 has a structure illustrated in the figure. The base station controller 2n has a similar structure.

Figure 2:
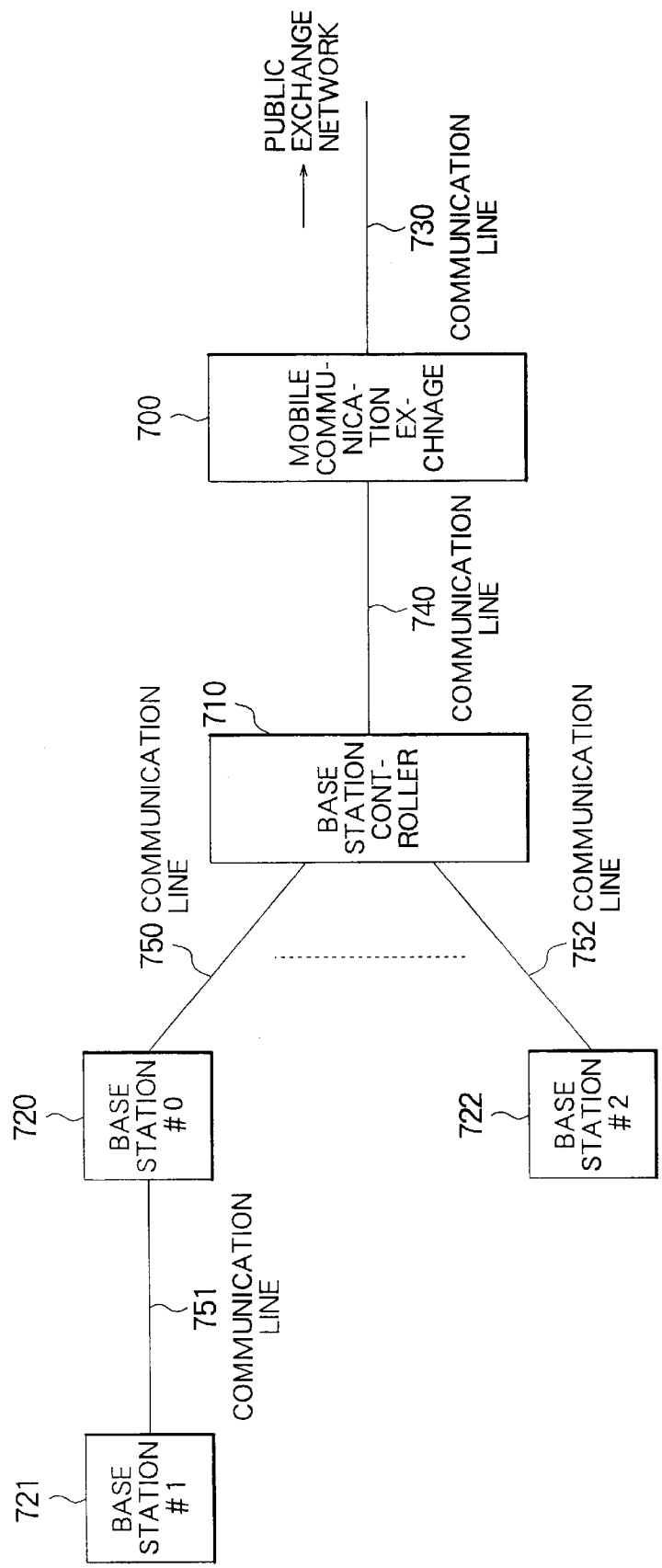
FIG. 2 is a block diagram of a conventional base station serial connection system in a mobile communication system.

The base station controller 20 performs communication with the mobile communication exchange 10 connected via the communication line 50 and with the base stations 33 and 34 individually connected via the private communication lines 63 and 64 by time-division multiplex transmission, in a manner similar to the conventional system illustrated in FIG. 2. On the other hand, communication with the base stations (#0 through #2) 30 through 32 serially connected to the shared communication lines 60 through 62 is carried out in the manner such that a communication signal (cell) is transmitted using as a user data area in a time-slotless fashion all of user time slot positions of the shared communication lines 60 through 62 as time-division multiplex transmission paths, as will later be described.

As illustrated in FIG. 5, the base station controller 20 comprises a central processing unit 200 for overall control, a transmission unit 210 terminating the communication line 50 connected to the mobile communication exchange 10, a plurality of channel units 230, 231, 232, . . . , and 23n for carrying out conversion of a speech code at each call and control of data communication, a collection/distribution unit 220 for distributing/collecting a speech signal between the channel units and the transmission unit 210, a transmission unit 270 terminating the shared communication line 60 for those base stations serially connected, transmission units 271 and 272 terminating the private communication lines 63 and 64 for those base stations individually connected, a plurality of header addition/deletion units 250 through 252 for processing the communication signal addressed to each of the base stations serially connected to the shared communication lines into a cell-structured communication signal to which header information (will later be described) corresponding to each base station is added or for deleting the header information from a cell-structured communication signal from each base station to convert the cell-structured communication signal into a time-division signal, a cell collection/distribution unit 260 arranged between the header addition/deletion units 250 through 252 and the transmission unit 270 for collecting/distributing the communication signal (cell) addressed to each base station, and a time division switch 240 for time-division connecting to the channel units 230 through 23n the header addition/deletion units 250 through 252 corresponding to those base stations connected to the shared communication lines and the transmission units 271 and 272 terminating the private communication lines.

Figure 6:
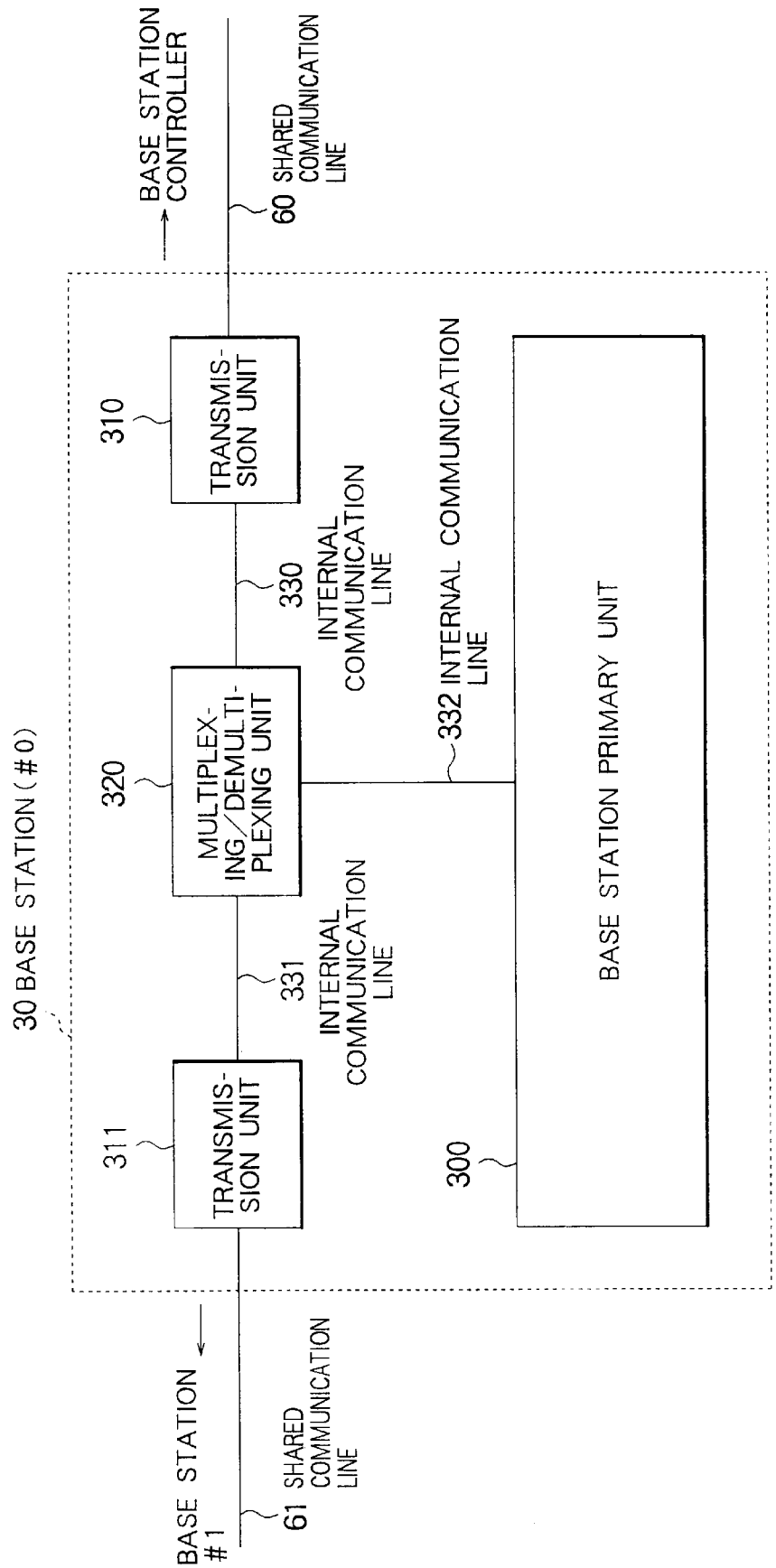
FIG. 6 is a block diagram of a base station illustrated in FIG. 4.

Referring to FIG. 6, the base station (#0) 30 has a structure illustrated in the figure. Other base stations connected to the shared communication lines have a simila structure.

As illustrated in FIG. 6, the base station (#0) 30 comprises a transmission unit 310 terminating the shared communication line 60 connected to the base station controller 20, a transmission unit 311 terminating the shared communication line 61 connected to the next base station (#1) 31 serially connected, a multiplexing/demultiplexing unit 320 connected to the transmission unit 310 through an internal communication line 330 and to the transmission unit 311 through an internal communication line 331 and supplied with the communication signals (cells) through the shared communication line 60 for demultiplexing the communication signal (cell) addressed to the base station (#0) 30 in consideration and, conversely, for multiplexing the communication signal (cell) to be transmitted to the shared communication line 60, and a base station primary unit 300 connected to the multiplexing/demultiplexing unit 320 through an internal communication line 332 for processing the communication signal (cell) addressed to the base station (#0) 30 in consideration and for transmitting from the base station (#0) 30 in consideration the communication signal (cell) addressed to the base station controller 20.

Figure 7:
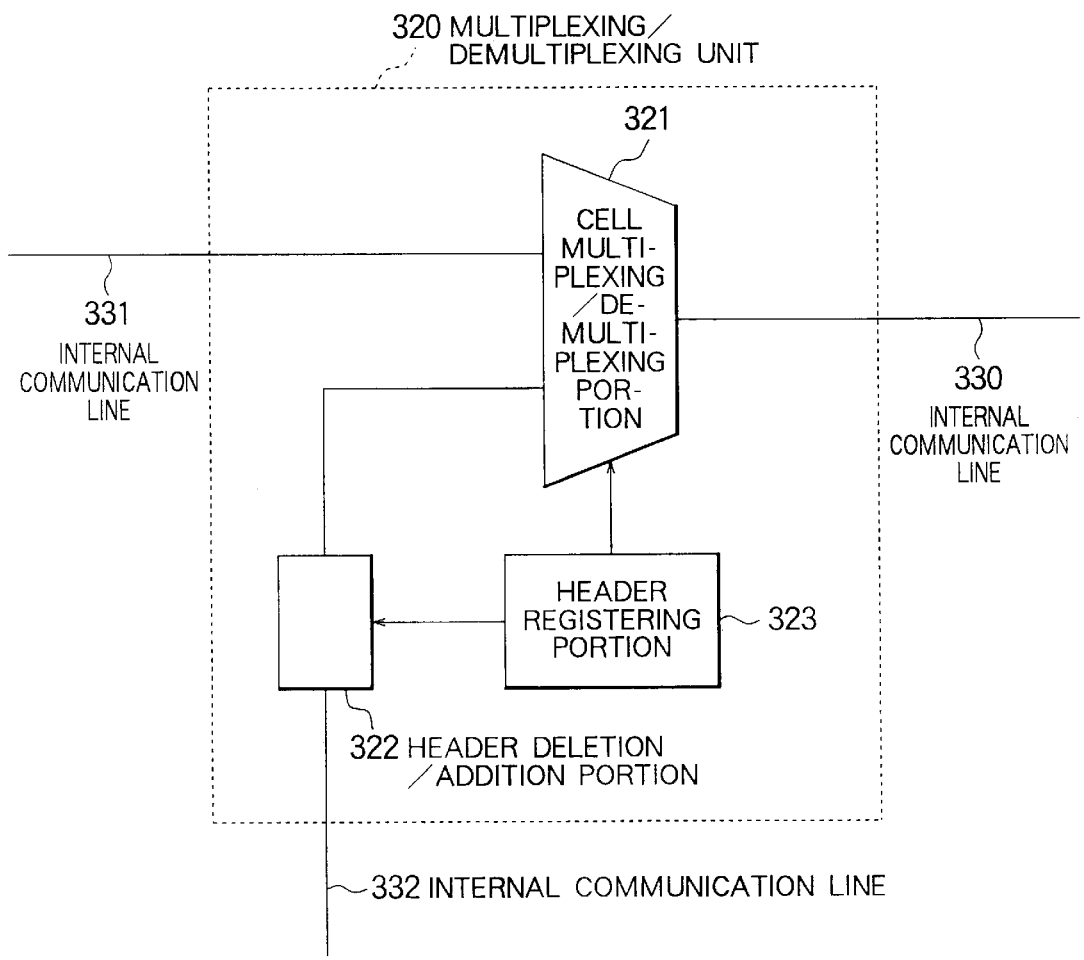
FIG. 7 is a block diagram of a multiplexing/demultiplexing unit 320 illustrated in FIG. 6.

Referring to FIG. 7, the multiplexing/demultiplexing unit 320 comprises a cell multiplexing/demultiplexing portion 321 connected between the internal communication lines 330 and 331 for multiplexing/demultiplexing the communication signal (cell) addressed to and transmitted from the base station (#0) 30, a header deletion/addition portion 322 for deleting the header of the communication signal (cell) demultiplexed and for adding the header to he communication signal to be multiplexed, and a header registering portion 323 for providing base station header information to the cell multiplexing/demultiplexing portion 321 and the header deletion/addition portion 322.

Figure 3:
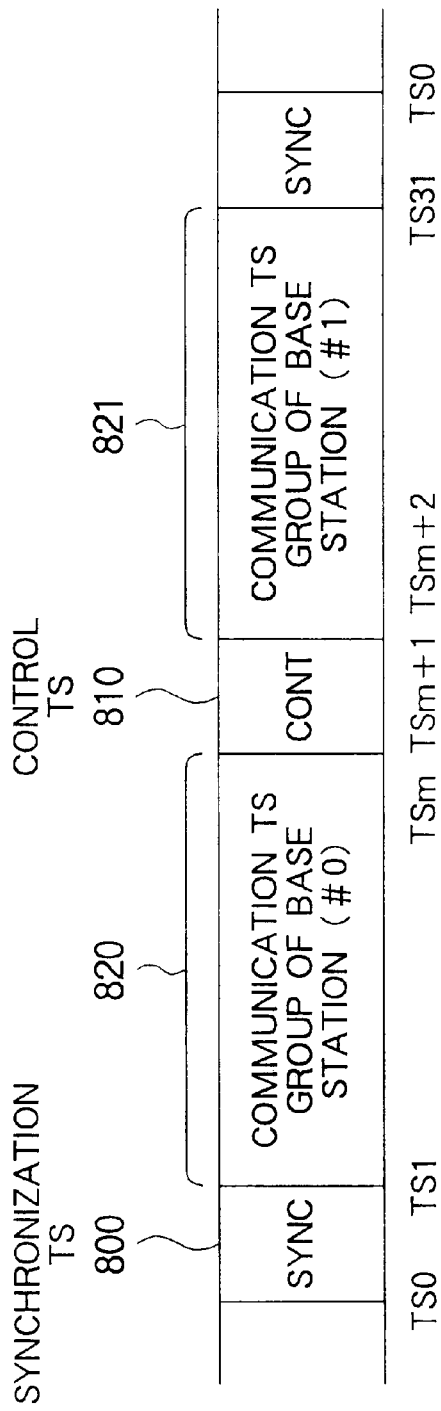
FIG. 3 is a view showing a frame structure for describing a multiplex transmission system for a shared communication line in FIG. 2.
Figure 9:
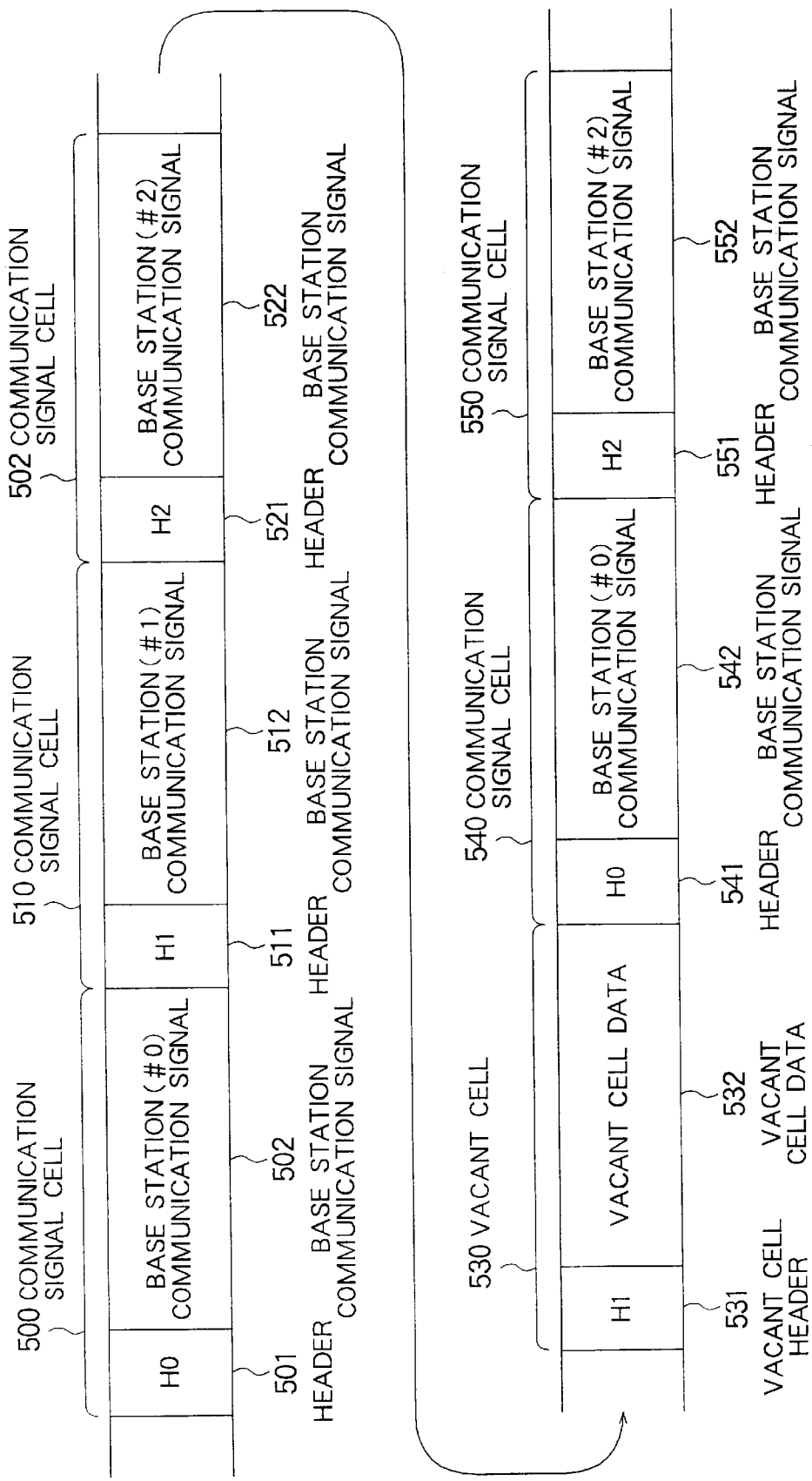
FIG. 9 is a view showing a frame structure of a cell multiplexed signal transmitted and received through a shared communication line in FIG. 4.

Referring to FIG. 9, a cell multiplexed signal transmitted and received through the shared communication line 60 illustrated in FIG. 4 has a frame structure illustrated in the figure. For example, transmission and reception are carried out via a communication line of 2 Mbps, like in the conventional system in FIG. 3. However, in the shared communication line (60, also similar in the shared communication lines 61, 62, 66, and 67) of this embodiment, frame data comprises 32 time slots (TS) per frame. Among these time slots, 30 TS except a synchronization TS for establishing frame synchronization and a control TS for controlling the shared communication lines (both of them not shown in FIG. 9) are used as a time-slotless shared user data area. The data in FIG. 9 are successively put on all of the time slot positions except the synchronization TS and the control TS to be transmitted.

In the example illustrated in FIG. 9, it is seen that, in the shared user data area comprising a plurality of frames in succession, communication signal cells 500 and 540 for the base station (#0) 30 and a communication signal cell 510 for the base station (#1) 31, communication signal cells 520 and 550 for the base station (#2) 32, and a vacant cell 530 inserted in absence of any communication signal cell are multiplexed and transmitted.

The communication signal cells 500 and 540 comprise headers 501 and 541 and base station (#0) communication signals 502 and 542, respectively. The communication signal cell 510 comprises a header 511 and a base station (#1) communication signal 512. The communication signal cells 520 and 550 comprise headers 521 and 551 and base station (#2) communication signals 522 and 552, respectively. The vacant cell 530 comprises a vacant cell header 531 and vacant cell data 532.

Next, description will be made about an operation of the base station serial connection communication system in a mobile communication system according to this invention.

Hereafter, down-link communication will be described first.

In the manner similar to the conventional base station controller, the base station controller 20 is operated as follows. The transmission unit 210 illustrated in FIG. 5 receives through the communication line 50 the communication signal (call processing control signal, maintenance operation signal, speech signal, data signal, or the like) from the mobile communication exchange 10 to each base station. The collection/distribution unit 220 distributes the communication signal thus received to the channel units 230 through 23n for carrying out speech conversion per channel and control of data communication. For example, if a 2 Mbps transmission path is used as the transmission line 50, the collection/distribution unit 220 demultiplexes multiplexed 30 channels into individual channels. These signals are distributed to the respective channel units.

The channel units 230 through 23n are used as shared resources and correspond to channels assigned in response to a call origination request from a mobile station not shown in the figure. The base station controller manages which channel is assigned to which base station. As regards the communication signals addressed to the base stations (#3 and #4) 33 and 34 individually connected via the private communication lines, the time-division switch 240 connects the corresponding channel units to the transmission units 271 and 272 corresponding to the respective base stations so that the communication signals are delivered through the private communication lines 63 and 64 like in the conventional system.

On the other hand, in this embodiment, the communication signal on each channel towards each of the base stations (#0 through #2) serially connected to the shared communication lines is delivered in the following manner. The time division switch 240 connects the corresponding channel units to the corresponding header addition/deletion units 250 through 252, respectively. The time division signals separated per channel are supplied to the corresponding header addition/deletion units 250 through 252, respectively.

Each of the header addition/deletion units 250 through 252 packetizes the input communication signal to be delivered to each base station and adds the header information containing the address identifier specific to the corresponding base station.

In the description of this embodiment, packetizing into a fixed-length cell is carried out like in the ATM (Asynchronous Transfer Mode) communication. Alternatively, use may be made of a variable-length packet like in the packet communication and the HDLC (High-level Data Link Control) communication.

The communication signal cells cell-structured by the header addition/deletion units 250 through 252 are cell-multiplexed by the cell collection/distribution unit 260 and successively delivered through the transmission unit 270 to the user data area of the communication line 60 in the manner described in the foregoing.

FIG. 9 shows one example of the cell-multiplexed signal in which the communication signals addressed to the respective base stations serially connected are cell-multiplexed by the cell collection/distribution unit 260.

The communication signal cells 500, 510, 520, 540, and 550 to be delivered to the base stations (#0 through #3) 30 through 32 comprise the base station (#0 through #3) communication signals 502, 512, 522, 542, and 552 and the header information 501, 511, 521, 541, and 551 containing communication address identifiers of the base stations (#0 through #3) and added by the header addition/deletion units 250 through 252, respectively.

Typically, the communication signal cells are sequentially arranged by the cell collection/distribution unit 260 in the order of arrival. In absence of any communication signal cell to be transmitted, the vacant cell 530 is inserted.

The vacant cell 530 comprises the vacant cell header 531 representative of the vacant cell and the vacant cell data 532.

The transmission unit 270 transmits the cell-multiplexed signal on the shared communication line 60 utilizing, for example, a 2 Mbps communication line in the user data area corresponding to 30 TS per frame except the synchronization TS and the control TS.

The communication signal delivered through the shared communication line 60 is at first received by the base station (#0) 30 directly connected to the base station controller 20. The cell-multiplexed signal comprising the communication signal cells 500, 510, 520, 540, and 550 and the vacant cell 530 illustrated in FIG. 9 is delivered to the cell multiplexing/demultiplexing portion 321 (FIG. 7).

The cell multiplexing/demultiplexing portion 321 checks the header portions of the communication signal cells 500, 510, 520, 540, and 550 and the vacant cell 530 received as mentioned above. In presence of a particular communication signal cell having an identifier coincident with a communication address identifier assigned to the base station in consideration and registered in the header registering portion 323, the particular communication signal cell (the communication signal cells 500 and 540 in this embodiment) is separated.

The communication signal cells 500 and 540 thus separated are transferred to the header deletion/addition portion 322 to delete the header information 501 and 541 so that the base station (#0) communication signals 502 and 542 alone are delivered through the internal communication line 332 to the base station primary unit 300 to be processed in the manner similar to the conventional system.

On the other hand, the communication signal cells and the vacant cells 510, 520, 530, and 550 addressed to other base stations are not demultiplexed by the cell multiplexing/demultiplexing portion 321 and transferred to the next base station (#1) 31 serially connected.

In case of the ATM system as in this embodiment, the cell multiplexing/demultiplexing portion 321 inserts a vacant cell (not shown) into a vacant area after the communication signal cells addressed to the base station in question are demultiplexed. The vacant cell thus inserted is multiplexed with the communication signal cells 510, 520, and 550 addressed to the other base stations serially connected and the vacant cell 530, and then transferred to the base station (#1) 31 connected next.

On the other hand, the next base station (#1) 31 serially connected is operated in the manner similar to the base station (#0) 30. Specifically, the cell multiplexing/demultiplexing portion demultiplexes the communication signal cell 510 addressed to the base station (#1) 31 itself. The other communication signal cells 520 and 550 are transferred through the shared communication line 62 to the base station (#2) 32 connected next.

The base station (#2) 32 performs the similar operation. However, the base station (#2) 32 is a terminal end of the base stations serially connected and therefore carries out no transferring operation.

Next, uplink communication will be described. In order to facilitate an understanding, the corresponding functions in uplink and downlink directions are represented by the same block in FIGS. 5 through 7. However, the actual device structure may include separate blocks in the uplink and the downlink directions.

An uplink communication signal from the base station (#2) 32 to the base station controller 20 is transferred to the header deletion/addition portion 322 through the internal communication line 332 of the base station (#2) 32. In the manner similar to the header addition/deletion units 250 through 252 of the base station controller 20 in FIG. 5, the header deletion/addition portion 322 processes the communication signal from the base station primary unit 300 of the base station in consideration to produce a cell-structured communication signal to which the header information containing the address identifier specific to the base station in consideration and registered in the heade registering portion 323 is added. If necessary, the cell multiplexing/demultiplexing portion 321 cell-multiplexes the cell-structured communication signal with the vacant cell to produce a cell-multiplexed signal which is delivered to the next base station (#1) 31 serially connected to the side of the base station controller.

In the base station (#1) 31 serially connected and located in the middle, the communication signal transmitted from the base station (#1) 31 to the base station controller 20 is converted by the header deletion/addition portion 322 into the cell-structured signal to which the header information containing the address identifier specific to the base station and registered in the header registering portion 323 is added. The cell-structured signal is transferred to the cell multiplexing/demultiplexing portion 321.

The cell multiplexing/demultiplexing portion 321 multiplexes the cell transmitted from the base station (#1) 31 onto the cell-multiplexed signal transferred from the base station (#2) 32 at a down level and transfers it to the next base station (#0) 30 serially connected to the side of the base station controller.

Likewise, the base station (#0) 30 cell-multiplexes upon the cell-multiplexed signal the communication signal from the base station itself to the base station controller 20. The cell-multiplexed signal is delivered to the base station control unit 20 through the shared communication line 60.

The cell collection/distribution unit 260 of the base station controller 20 receives the cell-multiplexed signal such as in FIG. 9 and distributes, with reference to the headers 501, 511, ... of the cells 500, 510, ..., the communication signal cells 500, 510, 520, 540, 550, ... to the corresponding header addition/deletion units 250 through 252 in accordance with the address identifiers of the base stations serially connected.

The header addition/deletion units 250 through 252 delete the header information 501, 511, ... from the distributed cell data and decell or disassemble the distributed cell data to reproduce the communication signals from the base stations as time-division signals.

Like the communication signals supplied from the base stations individually connected and received by the transmission units 271 and 272 terminating the private communication lines, the communication signals from the base stations serially connected as reproduced signals are supplied to the time division switch 240 (time division switch) to be connected to the corresponding channel units 230 through 23n where speech conversion per channel and control of data communication are performed. The communication signals are collected (time-division multiplexed) by the collection/distribution unit 220 and transmitted by the transmission unit 210 through the communication line 50 to the mobile communication exchange 10.

As described above, in this embodiment, each of the base stations serially connected to the shared communication lines is provided with the cell multiplexing/demultiplexing portion 321, the header deletion/addition portion 322, and the header registering portion 323. In the base station controller, the cell collection/distribution unit 260 and the header addition/deletion units 250 through 252 respectively corresponding to the base stations serially connected are provided between the switch and the transmission unit terminating the shared communication line. With the above-mentioned structure, it is readily possible to serially connect adjacent base stations having a relatively small traffic by a cell multiplex transmission system, utilizing the existing facility and the existing communication lines of the conventional mobile communication system.

Therefore, in case where a new base station is installed along a main road or a railroad line and a service area is set, it is possible to easily enlarge the service area by the use of a single physical communication line simply by providing the base station controller 20 with a new header addition/deletion unit corresponding thereto. As compared with star connection of base stations by the use of private communication lines, the line cost can considerably be reduced.

Furthermore, logical multiplexing is carried out by the use of the cell data which is given the header information containing the address identifier corresponding to each base station. This makes it possible to share the total communication capacity of the physical line (shared communication line) among all base stations serially connected to the physical line. Therefore, the load variation in each base station can be absorbed one another by the statistical multiplexing effect. Thus, occurrence of restricted communication can be considerably reduced to achieve an excellent line efficiency of the system.

In the foregoing, description has been made about the first embodiment of this invention in conjunction with the case where the time-division multiplex communication line of 2 Mbps is used as a physical line for the shared communication line. However, the shared communication line of this embodiment is not restricted thereto but may be any appropriate communication line corresponding to each of the transmission units terminating the shared communication line in the base station controller and in each base station.

In the first embodiment, only the communication signal between each of the base stations serially connected to the shared communication lines and the base station controller is transmitted by the cell multiplex communication system. This is preferred in case where a plurality of base stations serially connected to the shared communication lines according to the ATM cell transmission technique are newly added to an existing mobile communication network according to the time-division multiplexing technique. In this embodiment, however, in order to further install a new base station, it is necessary to provide the base station controller with a header addition/deletion unit corresponding to the new base station and to connect the header addition/deletion unit to the cell collection/distribution unit. Thus, some work such as addition of the hardware in the base station controller 20 is required.

Taking into account the installation of a new additional base station controller, communication between the base station controller 20 and all of the base stations may be carried out by the use of the cell data, as will hereinafter be described. In this event, in order to additionally install a new base station serially connected, it is sufficient to assign a new address identifier to the new base station without requiring modification of the structure of the base station controller. Thus, the base station can be easily added serially.

Figure 8:
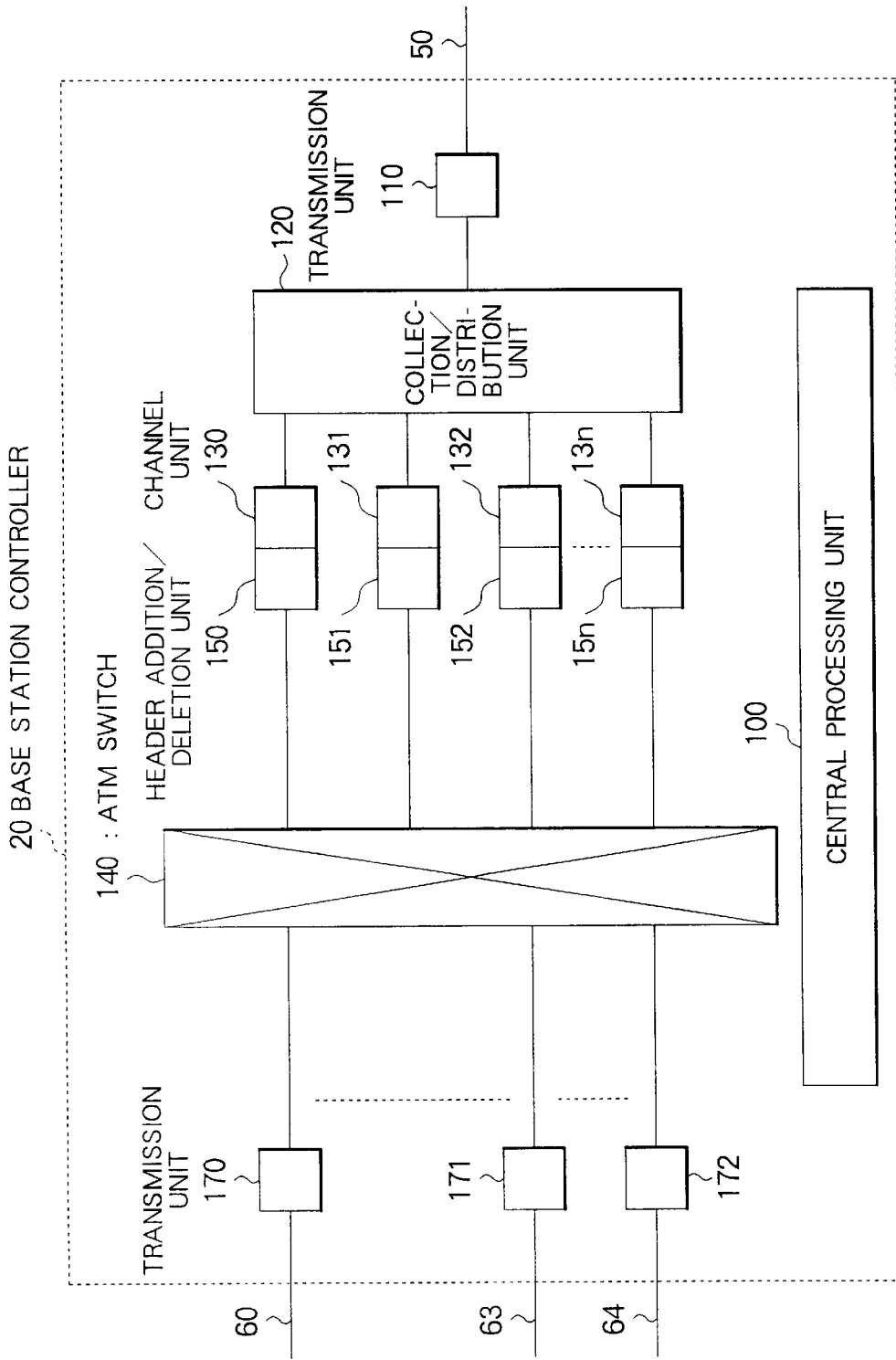
FIG. 8 is a block diagram showing a base station controller according to a second embodiment of this invention.

Referring to FIG. 8, a base station controller 20 according to a second embodiment of this invention comprises a central processing unit 100 for overall control, a transmission unit 110 terminating the communication line 50 connected to the mobile communication exchange 10, a plurality of channel units 130, 131, 132, . . . , and 13n for carrying out conversion of a speech code at each call and control of data communication, a plurality of header addition/deletion units 150, 151, 152, . . . , and 15n provided in these channel units, respectively, for adding or deleting the header information corresponding to each base station or each communication line, converting the communication signal from the mobile communication exchange 10 to each base station into ATM cell data, and converting the ATM cell data delivered from each base station into the communication signal to the mobile communication exchange 10, a plurality of transmission units 170 through 172 terminating the shared communication line 60 for the base stations serially connected and the private communication lines 63 and 64 for the base stations individually connected, respectively, and an ATM switch 140 for switching the communication signals, which are converted into the ATM cells by the header addition/deletion units 150 through 15n, to the corresponding transmission units 170 through 172 with reference to the header information corresponding to the communication lines and for switching the ATM cell data, which are delivered from the base stations and received by the transmission units 170 through 172, to the corresponding header addition/deletion units 150 through 15n with reference to the header information corresponding to the respective base stations.

In the second embodiment, the base stations (#3 and #4) 33 and 34 individually connected to the private communication lines have the structure described in conjunction with FIGS. 5 and 8, like the base stations (#0 through #2) 30 through 32 serially connected to the shared communication lines. However, the structure related to the transferring operation is eliminated from the base station (#2) 32 connected at a terminal end of serial connection and the base stations (#3 and #4) 33 and 34 individually connected.

Figure 10:
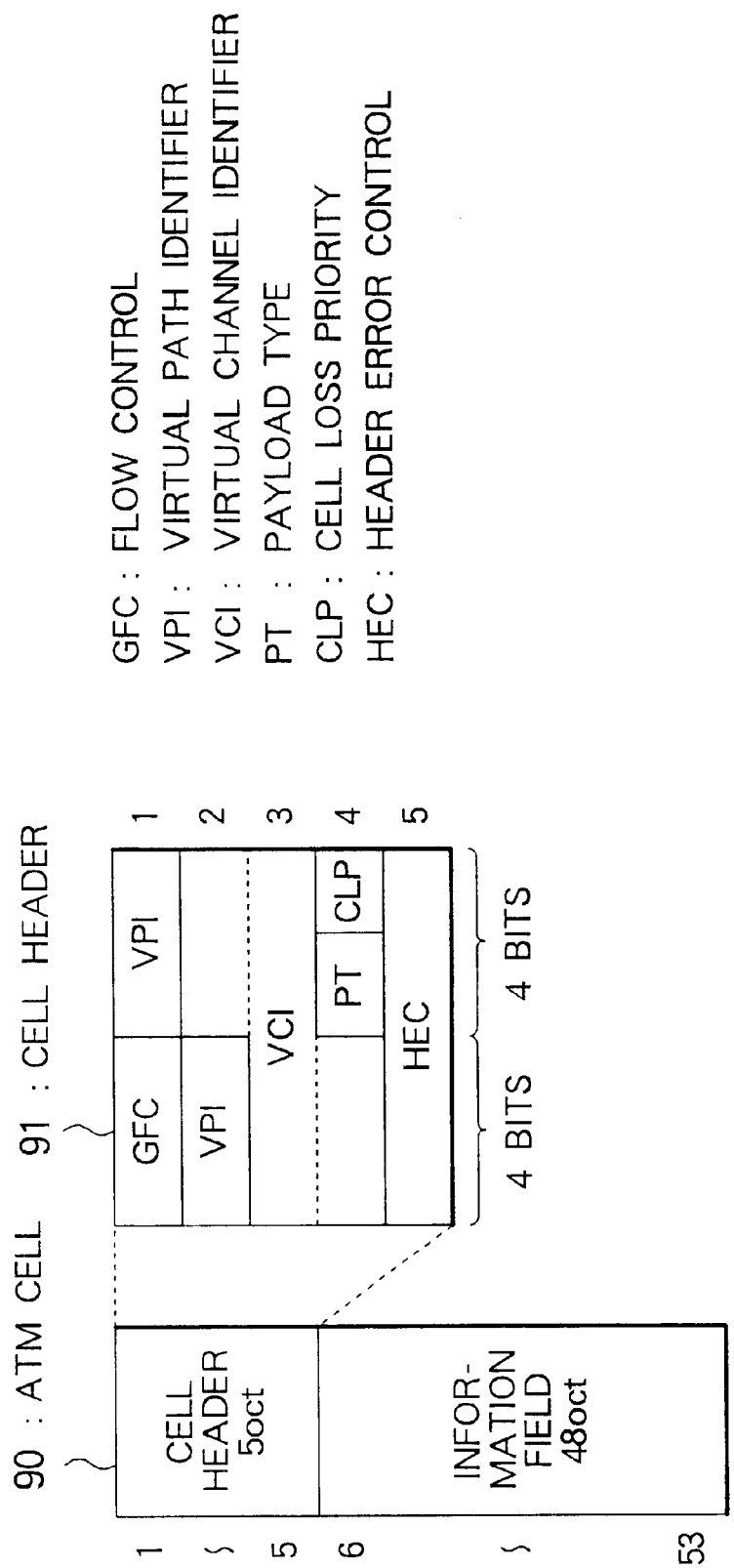
FIG. 10 is a view showing a format of an ATM cell.

In this embodiment, an ATM cell is used as a communication signal cell (for example, the communication signal cells 500, 510, 520, 540, and the like) for communication between the base station controller 20 and each of the base stations (#0 through #n) 30 through 30n. FIG. 10 shows a format of the ATM cell. The ATM cell 90 consists of 53 bytes including first 5 bytes used as a cell header 91. The cell header contains two identifiers, i.e., a VPI (virtual path identifier) of one byte and a VCI (virtual channel identifier) of two bytes.

In this embodiment, a downlink communication signal transmitted from the mobile communication exchange 10 to each base station through the communication line 50 is received by the transmission unit 110 and distributed by a collection/distribution unit 120 to the channel units 130 through 13n to be subjected to speech conversion per channel or control of data communication. Thereafter, the communication signal is divided by the header addition/deletion units 150 through 15n into every 48 bytes to which the cell header of 5 bytes is added to produce the ATM cell.

At this time, communication line identifier information for identifying each of the transmission units 170 through 172 corresponding to each of the base stations as a destination is written in the VPI field of the cell header. On the other hand, the address identifier of each base station as the destination is written into the VCI field.

The ATM switch 140 switches the downlink ATM cells in accordance with the communication line identifier information written in the VPI field of the cell header to distribute the ATM cells to the corresponding transmission units 170 through 172.

Each of the transmission units 170 through 172 inserts a vacant cell into the ATM cell distributed thereto, if necessary. The ATM cells are delivered as a cell multiplexed signal exemplified in FIG. 9 on the communication line of, for example, 2 Mbps.

In the manner similar to the first embodiment, each of the base stations serially connected to the shared communication lines extracts the communication signal cell addressed to the base station itself with reference to the address identifier written in the VCI field of the cell header and, on the other hand, adds the cell header with the address identifier of the base station written in the VCI field to the communication signal from the base station to the base station controller to produce an ATM cell which is cell-multiplexed and delivered towards the base station controller.

Like in the base station (#2) serially connected to the shared communication line at the terminal end, each of the base stations (#3 and #4) 33 and 34 individually connected via the private communication lines extracts the communication signal cell from a reception cell signal and deletes the cell header by the header deletion/addition portion 322 to reproduce the communication signal which is processed in the base station primary unit 300.

On the other hand, the communication signal from the base station primary unit to the base station controller is processed by the header deletion/addition portion 322 into the ATM cell to which the header information with the address identifier registered in the header registering portion 323 written in the VCI field is added. The ATM cell is delivered through the cell multiplexing/demultiplexing portion 321 and the transmission unit 310 to the private transmission lines 63 and 64.

The communication signals delivered via the shared communication line 60 and the private communication lines 63 and 64 to the base station controller 20 are received by the corresponding transmission units 170 through 172 where the communication signal cells are extracted and transferred to the ATM switch 140.

With reference to the address identifier of each base station written in the VCI field of the cell header, the ATM switch 140 switches the uplink ATM cells to distribute the ATM cells to the header addition/deletion units 150 through 15n.

The header addition/deletion units 150 through 15n delete the cell headers from the ATM cells to reproduce the uplink communication signals from the base stations. The reproduced communication signals are sent through the corresponding channel units 130 through 13n and collected by the collection/distribution unit 120 to be delivered through the transmission unit 110 to the mobile communication exchange 10.

As described above, in the second embodiment, all of the channel units and the lower-level units in the base station controller are controlled by the same transmission system (ATM cell). Therefore, even if the new base station or the new line is additionally installed, it is readily possible to deal with the additional installation simply by assigning an address to the added apparatus and modifying the station data in the base station controller. For example, since the channel units are administrated as common resources as described above, which channel is assigned to which base station is administrated by the central processing unit of the base station controller. Which base station is connected to which transmission path is preliminarily administrated as the station data by the central processing unit. Therefore, the central processing unit requests that the header information to be added by the header addition/deletion unit corresponding to the channel unit is the information corresponding to the base station assigned at the stage of call establishment. With reference to the header information, the ATM switch successively delivers the input cells to the transmission units corresponding to the relevant transmission paths. Thus, routing in the base station controller can easily be controlled and modified with reference to the internal administration information.

As described above, in the base station serial connection communication system in the mobile communication system according to this invention, it is possible to reduce the number of physical communication lines by connecting a plurality of adjacent base stations having a relatively small traffic to a single physical line (shared communication line). Thus, a line cost can be saved.

Particularly when the service area is set along the main road or the railroad line, the line cost can be considerably reduced as compared with star connection of the base stations in the conventional system.

In the serial connection communication system according to this invention, the communication signals of the base stations serially connected are transmitted and received by logical multiplexing using the cells having the address identifiers as the header information. Therefore, a statistical multiplexing effect is obtained by sharing the capacity of the whole physical line (shared communication line) among the base stations serially connected. Thus, the load variation in the respective base stations can be absorbed one another to thereby achieve an excellent line efficiency of the system.

Since the logical multiplexing is used, a new base station can be serially added simply by assigning a new address to the new base station without requiring modification of the line setting of the existing base stations or the structure of the existing base station controller. Thus, additional installation of the base station is readily possible.

What is claimed is:

1. A base station serial connection communication system in a mobile communication system including a base station controller for controlling a plurality of base stations serially connected through a shared communication line, wherein:
   a communication signal between said base station controller and each of said base stations serially connected is converted into a communication signal cell which is given header information containing an address identifier of a corresponding one of said base stations, said communication signal cell being collected into a cell multiplexed signal to be transmitted or received through said shared communication line,
   wherein said shared communication line is a time-division multiplex communication line, said cell multiplexed signal being transmitted or received using as a user data area in a time-slotless fashion all of a plurality of time slots forming each frame of said time-division multiplexed communication line except a synchronization time slot for establishing frame synchronization and a control time slot for use in line control.

2. A base station serial connection communication system in a mobile communication system including a base station controller for controlling a plurality of base stations serially connected through a shared communication line, wherein said base station controller comprises:
   a plurality of header addition/deletion units provided in one-to-one correspondence to said base stations serially connected to said shared communication line, each of said units being for converting a communication signal to be transmitted to a corresponding one of said base stations into a communication signal cell which is given header information containing an address identifier of the corresponding base station, and for deleting header information from a communication signal cell transmitted from the corresponding base station to convert the communication signal cell into a communication signal to be transmitted to a mobile communication exchange; and
   a cell collection/distribution unit for collecting the communication signal cells obtained by conversion in said header addition/deletion units to produce a cell multiplexed signal to be transmitted through said shared communication line, and for distributing communication signal cells multiplexed in a cell multiplexed signal received through said shared communication line to corresponding ones of said header addition/deletion units in accordance with address identifiers contained in the header information.

3. A base station serial connection communication system in a mobile communication system as claimed in claim 2, wherein a variable-length packet is used as said communication signal cell.

4. A base station serial connection communication system in a mobile communication system as claimed in claim 2, wherein a fixed-length packet is used as said communication signal cell.

5. A base station serial connection communication system in a mobile communication system as claimed in claim 2, wherein said shared communication line is a time-division multiplex communication line, said cell multiplexed signal being transmitted or received using as a user data area in a time-slotless fashion all of a plurality of time slots forming each frame of said time-division multiplex communication line except a synchronization time slot for establishing frame synchronization and a control time slot for use in line control.

6. A base station serial connection communication system in a mobile communication system including a base station controller for controlling a plurality of base stations serially connected through a shared communication line, wherein each of said base stations serially connected to said shared communication line comprises:
   a header registering portion in which header information containing an address identifier of the base station in consideration is registered;
   a cell multiplexing/demultiplexing portion which is for extracting, from a cell multiplexed signal delivered in a direction downstream from said base station controller through said shared communication line, a communication signal cell having the header information registered in said header registering portion and, if any base station is connected to a lower level downstream of said shared communication line, transferring the remaining part of the cell multiplexed signal towards a terminal end through said shared communication line and which is for collecting a communication signal cell to be delivered from the base station in consideration to said base station controller into a cell multiplexed signal to be delivered towards said base station controller through said shared communication line or, if any base station is connected to a lower level downstream of said shared communication line, multiplexing the communication signal cell onto a cell multiplexed signal supplied in a direction upstream from the terminal end; and a header deletion/addition portion for deleting the header information from the communication signal cell extracted by said cell multiplexing/demultiplexing portion to reproduce a communication signal addressed to the base station in consideration and for adding the header information registered in said header registering portion to a communication signal to be transmitted from the base station in consideration to said base station controller to convert the communication signal into the communication signal cell to be transmitted to said base station controller.

7. A base station serial connection communication system in a mobile communication system as claimed in claim 6, wherein a variable-length packet is used as said communication signal cell.

8. A base station serial connection communication system in a mobile communication system as claimed in claim 6, wherein a fixed-length packet is used as said communication signal cell.

9. A base station serial connection communication system in a mobile communication system as claimed in claim 6, wherein said shared communication line is a time-division multiplex communication line, said cell multiplexed signal being transmitted or received using as a user data area in a time-slotless fashion all of a plurality of time slots forming each frame of said time-division multiplex communication line except a synchronization time slot for establishing frame synchronization and a control time slot for use in line control.

10. A base station serial connection communication system in a mobile communication system including a base station controller for controlling a plurality of base stations serially connected through a shared communication line, wherein:

said base station controller comprises:

a plurality of header addition/deletion units provided in one-to-one correspondence to said base stations serially connected to said shared communication line, each of said units being for converting a communication signal to be transmitted to a corresponding one of said base stations into a communication signal cell which is given header information containing an address identifier of the corresponding base station, and for deleting header information from a communication signal cell transmitted from the corresponding base station to convert the communication signal cell into a communication signal to be transmitted to a mobile communication exchange; and a cell collection/distribution unit for collecting the communication signal cells obtained by conversion in said header addition/deletion units to produce a cell multiplexed signal to be transmitted through said shared communication line, and for distributing communication signal cells multiplexed in a cell multiplexed signal received through said shared communication line to corresponding ones of said header addition/deletion units in accordance with address identifiers contained in the header information;

each of said base stations serially connected to said shared communication line comprising:

a header registering portion in which header information containing an address identifier of the base station in consideration is registered;

a cell multiplexing/demultiplexing portion which is for extracting, from a cell multiplexed signal delivered in a direction downstream from said base station controller through said shared communication line, a communication signal cell having the header information registered in said header registering portion and, if any base station is connected to a lower level downstream of said shared communication line, transferring the remaining part of the cell multiplexed signal towards a terminal end through said shared communication line and which is for collecting a communication signal cell to be delivered from the base station in consideration to said base station controller into a cell multiplexed signal to be delivered towards said base station controller through said shared communication line or, if any base station is connected to a lower level downstream of said shared communication line, multiplexing the communication signal cell onto a cell multiplexed signal supplied in a direction upstream from the terminal end; and a header deletion/addition portion for deleting the header information from the communication signal cell extracted by said cell multiplexing/demultiplexing portion to reproduce a communication signal addressed to the base station in consideration and for adding the header information registered in said header registering portion to a communication signal to be transmitted from the base station in consideration to said base station controller to convert the communication signal into the communication signal cell to be transmitted to said base station controller.

11. A base station serial connection communication system in a mobile communication system as claimed in claim 10, wherein a variable-length packet is used as said communication signal cell.

12. A base station serial connection communication system in a mobile communication system as claimed in claim 10, wherein a fixed-length packet is used as said communication signal cell.

13. A base station serial connection communication system in a mobile communication system as claimed in claim 10, wherein said shared communication line is a time-division multiplex communication line, said cell multiplexed signal being transmitted or received using as a user data area in a time-slotless fashion all of a plurality of time slots forming each frame of said time-division multiplex communication line except a synchronization time slot for establishing frame synchronization and a control time slot for use in line control.

14. A base station serial connection communication system in a mobile communication system including a base station controller for controlling a plurality of base stations serially connected through a shared communication line or individually connected through private communication lines, wherein said base station controller comprises:

an ATM (Asynchronous Transfer Mode) switch for switching an ATM cell;

a plurality of header addition/deletion units provided in one-to-one correspondence to a plurality of channel units each of which is for converting a reception signal supplied from a mobile communication exchange into a communication signal to be transmitted to a corresponding one of said base stations and for converting a communication signal supplied from each of said base stations into a signal to be transmitted to said mobile communication exchange, each of said header addition/deletion units being for converting the communication signal transferred from a corresponding one of said channel units into the ATM cell with header information added thereto and transferring the ATM cell to said ATM switch, said header information including an address identifier of a destination base station as a VCI (virtual channel identifier) and identifier information of a communication line connected to said destination base station as a VPI (virtual path identifier), said header addition/deletion unit being for deleting the header information from the ATM cell switched by said ATM switch to reproduce a communication signal which is transferred to a corresponding one of said channel units; and a plurality of transmission units terminating said shared communication line and said private communication lines, respectively, for cell-multiplexing ATM cells switched by said ATM switch to produce a cell multiplexed signal to be transmitted to a corresponding one of said shared communication line and said private communication lines, and for transferring to said ATM switch the ATM cells multiplexed into a cell multiplexed signal supplied from a corresponding one of said shared communication line and said private communication lines;

said ATM switch being supplied with the ATM cell transferred from each of said header addition/deletion units for switching the ATM cell to a corresponding one of said transmission units with reference to the VPI, and being also supplied with the ATM cell transferred from each of said transmission units for switching the ATM cell to a corresponding one of said header addition/deletion units with reference to the VCI.

15. A base station serial connection communication system in a mobile communication system as claimed in claim 14, wherein each of said shared communication line and said private communication lines is a time-division multiplex communication line, said cell multiplexed signal being transmitted or received using as a user data area in a time-slotless fashion all of a plurality of time slots forming each frame of said time-division multiplex communication line except a synchronization time slot for establishing frame synchronization and a control time slot for use in line control.

16. A base station serial connection communication system in a mobile communication system as claimed in claim 15, wherein said transmission unit provided in said base station controller and said cell multiplexing/demultiplexing portion provided in each of said base stations serially connected through said shared communication line or individually connected through private communication lines insert into said cell multiplexed signal an ATM cell with a vacant cell header representative of inclusion of no communication signal in absence of a transmission ATM cell to be transmitted.

17. A base station serial connection communication system in a mobile communication system including a base station controller for controlling a plurality of base stations serially connected through a shared communication line or individually connected through private communication lines, wherein each of said base stations serially connected to said shared communication line comprises:

a header registering portion in which header information containing an address identifier of the base station in consideration is registered;

a cell multiplexing/demultiplexing portion which is for extracting, from a cell multiplexed signal delivered in a direction downstream from said base station controller through said shared communication line, an ATM cell having the header information registered in said header registering portion and, if any base station is connected to a lower level downstream of said shared communication line, transferring the remaining part of the cell multiplexed signal towards a terminal end through said shared communication line and which is for collecting an ATM cell to be delivered from the base station in consideration to said base station controller into a cell multiplexed signal to be delivered towards said base station controller through said shared communication line or, if any base station is connected to a lower level downstream of said shared communication line, multiplexing the ATM cell onto a cell multiplexed signal supplied in a direction upstream from the terminal end; and a header deletion/addition portion for deleting the header information from the ATM cell extracted by said cell multiplexing/demultiplexing portion to reproduce a communication signal addressed to the base station in consideration and for adding the header information registered in said header registering portion to a communication signal to be transmitted from the base station in consideration to said base station controller to convert the communication signal into the ATM cell to be transmitted to said base station controller.

18. A base station serial connection communication system in a mobile communication system as claimed in claim 17, wherein each of said shared communication line and said private communication lines is a time-division multiplex communication line, said cell multiplexed signal being transmitted or received using as a user data area in a time-slotless fashion all of a plurality of time slots forming each frame of said time-division multiplex communication line except a synchronization time slot for establishing frame synchronization and a control time slot for use in line control.

19. A base station serial connection communication system in a mobile communication system as claimed in claim 18, wherein said transmission unit provided in said base station controller and said cell multiplexing/demultiplexing portion provided in each of said base stations serially connected through said shared communication line or individually connected through private communication lines insert into said cell multiplexed signal an ATM cell with a vacant cell header representative of inclusion of no communication signal in absence of a transmission ATM cell to be transmitted.

20. A base station serial connection communication system in a mobile communication system including a base station controller for controlling a plurality of base stations serially connected through a shared communication line or individually connected through private communication lines, wherein:

said base station controller comprises:

an ATM (Asynchronous Transfer Mode) switch for switching an ATM cell;

a plurality of header addition/deletion units provided in one-to-one correspondence to a plurality of channel units each of which is for converting a reception signal supplied from a mobile communication exchange into a communication signal to be transmitted to a corresponding one of said base stations and for converting a communication signal supplied from each of said base stations into a signal to be transmitted to said mobile communication exchange, each of said header addition/deletion units being for converting the communication signal transferred from a corresponding one of said channel units into the ATM cell with header information added thereto and transferring the ATM cell to said ATM switch, said header information including an address identifier of a destination base station as a VCI (virtual channel identifier) and identifier information of a communication line connected to said destination base station as a VPI (virtual path identifier), said header addition/deletion unit being for deleting the header information from the ATM cell switched by said ATM switch to reproduce a communication signal which is transferred to a corresponding one of said channel units; and a plurality of transmission units terminating said shared communication line and said private communication lines, respectively, for cell-multiplexing ATM cells switched by said ATM switch to produce a cell multiplexed signal to be transmitted to a corresponding one of said shared communication line and said private communication lines, and for transferring to said ATM switch the ATM cells multiplexed into a cell multiplexed signal supplied from a corresponding one of said shared communication line and said private communication lines;

said ATM switch being supplied with the ATM cell transferred from each of said header addition/deletion units for switching the ATM cell to a corresponding one of said transmission units with reference to the VPI, and being also supplied with the ATM cell transferred from each of said transmission units for switching the ATM cell to a corresponding one of said header addition/deletion units with reference to the VCI;

each of said base stations serially connected to said shared communication line comprising:

a header registering portion in which header information containing an address identifier of the base station in consideration is registered;

a cell multiplexing/demultiplexing portion which is for extracting, from a cell multiplexed signal delivered in a direction downstream from said base station controller through said shared communication line, an ATM cell having the header information registered in said header registering portion and, if any base station is connected to a lower level downstream of said shared communication line, transferring the remaining part of the cell multiplexed signal towards a terminal end through said shared communication line and which is for collecting an ATM cell to be delivered from the base station in consideration to said base station controller into a cell multiplexed signal to be delivered towards said base station controller through said shared communication line or, if any base station is connected to a lower level downstream of said shared communication line, multiplexing the ATM cell onto a cell multiplexed signal supplied in a direction upstream from the terminal end; and a header deletion/addition portion for deleting the header information from the ATM cell extracted by said cell multiplexing/demultiplexing portion to reproduce a communication signal addressed to the base station in consideration and for adding the header information registered in said header registering portion to a communication signal to be transmitted from the base station in consideration to said base station controller to convert the communication signal into the ATM cell to be transmitted to said base station controller.

21. A base station serial connection communication system in a mobile communication system as claimed in claim 20, wherein each of said shared communication line and said private communication lines is a time-division multiplex communication line, said cell multiplexed signal being transmitted or received using as a user data area in a time-slotless fashion all of a plurality of time slots forming each frame of said time-division multiplex communication line except a synchronization time slot for establishing frame synchronization and a control time slot for use in line control.

22. A base station serial connection communication system in a mobile communication system as claimed in claim 21, wherein said transmission unit provided in said base station controller and said cell multiplexing/demultiplexing portion provided in each of said base stations serially connected through said shared communication line or individually connected through private communication lines insert into said cell multiplexed signal an ATM cell with a vacant cell header representative of inclusion of no communication signal in absence of a transmission ATM cell to be transmitted.

* * * * *